June 27, 1967 P. SCHAGEN ETAL 3,328,586

DISPLAY SYSTEM WITH SPATIAL NOISE ELIMINATION USING NEGATIVE IMAGE OF NOISE

Filed Jan. 25, 1965 2 Sheets-Sheet 1

INVENTORS
PIETER SCHAGEN
DONALD G. TAYLOR

BY Frank R. Trifari

AGENT

June 27, 1967 P. SCHAGEN ETAL 3,328,586

DISPLAY SYSTEM WITH SPATIAL NOISE ELIMINATION USING NEGATIVE IMAGE OF NOISE

Filed Jan. 25, 1965

2 Sheets-Sheet 2

INVENTORS
PIETER SCHAGEN
DONALD G. TAYLOR

BY Frank R. Trifari

AGENT

United States Patent Office 3,328,586

Patented June 27, 1967

3,328,586

DISPLAY SYSTEM WITH SPATIAL NOISE ELIMINATION USING NEGATIVE IMAGE OF NOISE

Pieter Schagen, Redhill, Surrey, and Donald George Taylor, Christchurch, Hants, England, assignors to North American Philips Company, Inc., New York, N.Y., a corporation of Delaware Filed Jan. 25, 1965, Ser. No. 427,547
Claims priority, application Great Britain, Oct. 30, 1964, 3,805/64
3 Claims. (Cl. 250—217)

This invention relates to image display and/or conversion systems.

Image conversion systems are known wherein an image is converted to another form. Examples of such systems are flying spot scanners with an associated photo-multiplier in which a scanned image is converted to a video signal, converters wherein a radiaton image in radiation of one wavelength is converted to one in radiation of a different wavelength, for example in X-ray to visible image converter tubes and radar systems wherein an echo of electromagnetic radiation is converted to a visible image on a cathode ray tube screen. Image display systems are also known. These may for example include an image intensifier tube.

It is sometimes a disadvantage with such systems that the conversion or display process introduces unwanted noise into the converted or displayed image. This noise may be introduced in various ways, the random noise generated in associated electronic circuitry being one of the possibilities. Another possibility is that an image formed in some part of the system may be superimposed upon a pattern (which may be a random one) of unwanted intensity fluctuations, which pattern may be called "spatial noise." For example, the electron beam of the flying spot scanner in the first mentioned example above may impinge upon a phosphor screen which varies in its efficiency at different points across its area, and consequently the light from such a screen (which may impinge upon a photo-multiplier) will vary in intensity even in the absence of an image to be converted. When an image is present these intensity variations will be superimposed upon it when it is transferred to the subsequent part of the system. In the same way the phosphor screen of the photo-cathode of an X-ray-to-visible image converter tube or an image intensifier tube may vary in sensitivity across its area, again introducing spatial noise into the converted image. A radar image may also suffer from the same defect which may be caused in this case by the existence of spatial noise comprising the image of certain fixed uninteresting objects in the area scanned by the radar beam, it being preferable to remove the effect of these objects in order to observe images of interest more clearly.

The presence of spatial noise (by which is meant an unwanted pattern modifying a desired image in a manner which is stable in situation and time) is particularly disadvantageous when the wanted image is low in contrast. Any measures taken to improve the contrast, e.g. by black level adjustment, will result in improving the contrast of the noise too. This may means that there is no net improvement in the clarity of the image.

In order to reduce spatial noise due to a phosphor screen it is possible to reduce the variations in efficiency over the surface of the screen from the usual value of around twenty percent to one or two percent by suitable processing, but the presence of the residual variation is still a great disadvantage when dealing with low contrast images.

It is an object of the invention to provide an image display and/or conversion system which can give a further substantial reduction in spatial noise.

The invention provides an image display and/or conversion system including a filter in an image plane of said system, said filter carrying a negative image of spatial noise which would otherwise occur in the displayed or converted image.

The term "image plane" is to be understood to mean a position where a real image of either the image to be displayed or converted or of the displayed or converted image is present in operation.

The filter may be a photographic negative.

The system may include means for forming an image on a screen the filter being arranged in a light path from the screen. The screen may be a phosphor screen, and this phosphor screen may be the screen of an image converter tube.

As an alternative the phosphor screen may be the screen of a flying spot scanner tube for scanning an object (which may be the filter) arranged in the light path from the screen. The system may include means for supplying a video signal to a brightness control electrode of this scanner tube.

The filter may be arranged adjacent the screen, possibly with a bundle of fibre optical elements provided between the screen and the filter for extending the image plane at the screen up to the filter.

As an alternative a lens system may be provided in the light path from the screen for forming an image of the image on the screen at an image plane, the filter being arranged in this plane.

The light path may extend from the screen to a photosensitive element, for example a photo-cell, this element having an output terminal for supplying an output video signal representative of the image incident thereon via the filter. This video signal may, in turn, be applied to black-level adjuster and/or signal manipulator means for accentuating the contrast in the image represented by this video signal.

The invention will be described by way of example with reference to the diagrammatic drawings accompanying the specification in which drawings FIGURES 1 to 4 show four embodiments and in which identical numerals have been given as far as possible to similar components.

Figure 1:
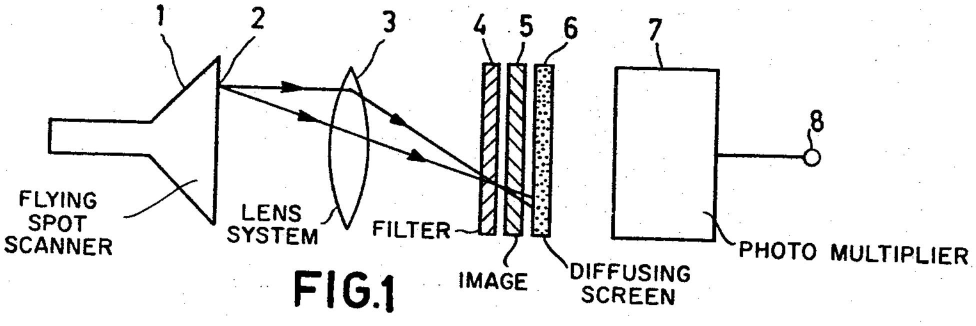
FIGURE 1 is a diagram of one embodiment of an image conversion system according to the invention.

FIGURE 1 shows a conversion system for converting a photographic image to a video signal. In FIGURE 1 numeral 1 denotes a flying spot scanner tube having a spot on its screen at a given time denoted by 2. 3 denotes a lens system for imaging the spot on to an image plane which contains a filter comprising a photographic negative 4, and an object to be scanned comprising a photographic image 5, arranged to be as close together as possible in the light path from the screen. Light transmitted by the photographic image is suitably diffused by a diffusing screen 6 placed adjacent said photographic image and picked up by a photo-sensitive element comprising a photo-multiplier 7 which supplies a video signal at its output terminal 8. It will be seen that the embodiment is a simple flying spot scanner with the inclusion of the photographic negative 4.

The negative 4 is arranged to carry a negative image of any spatial noise present in the system which would otherwise occur in the converted photographic image, which noise it is desired to eliminate. The noise may arise through non-uniform sensitivity of the phosphor screen of the tube 1 for example an image of this noise being formed on the screen when it is scanned by the spot. The negative 4 may be made as follows:

The system is initially set up without the photographic negative and image 4 and 5 and a photographic film is placed at the position shown occupied by the negative. The scanner is set into operation and the film suitably exposed to the image traced out by the spot 2. The film is subsequently developed to provide a record of any spatial noise present, a negative thereof being the negative 4. Some care is needed in obtaining the right exposure time and developing procedure. This will be elaborated upon below. The negative 4 is then placed in the system to provide a correction filter for the spatial noise of the system, any variation in the brightness of the spot 2 being exactly compensated by inverse variations in the transmission of the negative 4 at the corresponding image point of the spot. Thus when the photographic image 5 is placed in the system, it "sees" a scanning spot of constant intensity, any spatial noise generated by the tube 1 or lens system 3 being effectively removed.

Figure 2:
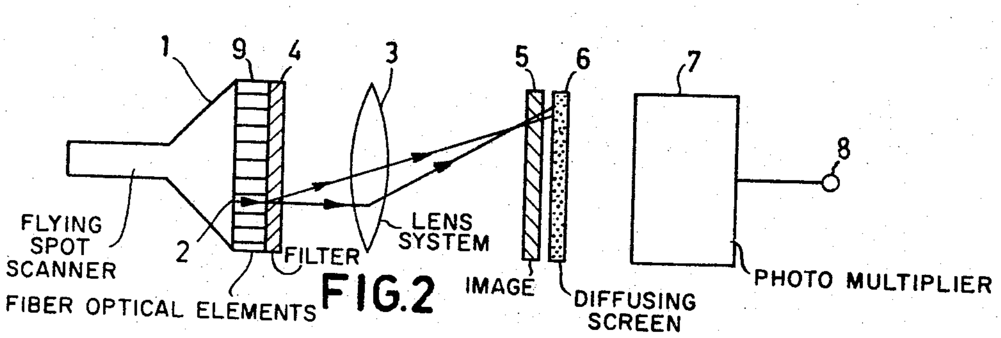
FIGURE 2 is a diagram of another embodiment of an image conversion system according to the invention.

As an alternative the negative 4 may be placed between the image 5 and the screen 6. It may also be placed (as the unexposed film must then be) at the other image plane of the system, i.e. adjacent the screen of the flying spot scanning tube as shown in FIGURE 2. If this is done the face of the tube 1 preferably comprises a bundle of so-called fibre optical elements 9 to effectively extend the image plane formed by the face phosphor up to the negative 4. If fibre optical elements are not used a loss of definition will occur in the filter negative "image" when exposing the film (in its new position adjacent the face) in order to obtain a record of the spatial noise.

This is because the inevitable layer of glass between the phosphor and film will allow spreading of light rays therein, before they impinge upon the film. For the same reason an additional loss of definition in the correcting action of the filter will occur when the negative is subsequently used for spatial noise reduction in this position, the absence of fibre optical elements. If the negative is placed adjacent the screen of the tube 1 the lens system 3 may be omitted and the components 5, 6 and 7 placed immediately adjacent the negative, i.e. closed up to it.

Figure 3:
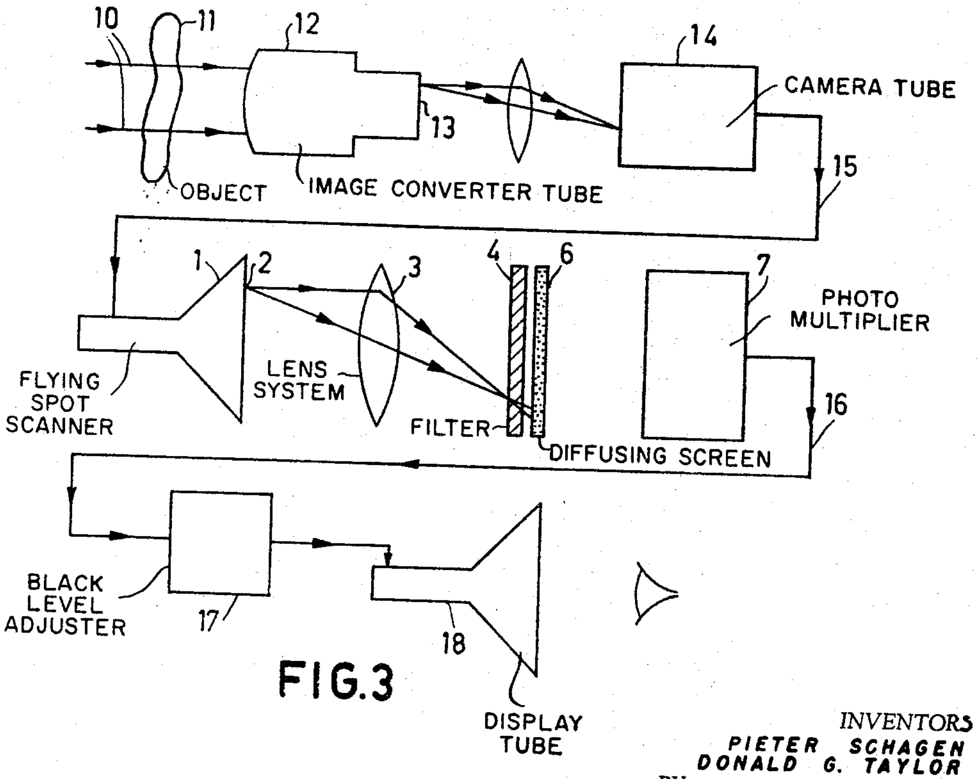
FIGURE 3 is a diagram of an image converter system for displaying an X-ray image embodying the invention.

FIGURE 3 shows the invention applied to an X-ray conversion and display system in which a low contrast image is improved in contrast by black level adjustment. X-rays 10, after traversing the object 11 to be investigated, are incident upon an X-ray image converter tube 12 which forms a visible image on a face 13 thereof. This visible image is scanned by a television camera tube 14 and converted to a first video signal which is conveyed via conductor 15 to a brightness control electrode of the flying spot scanner tube 1 which thus acts effectively also as a first television display tube. The spot 2 in the face of the said tube is focussed by the lens system 3 on to an image plane containing a filler comprising a photographic negative 4 and thus scans said negative. After transmission through said negative the light from the spot passes through diffusing layer 6 and impinges upon photo-multiplier 7 which produces a second video signal. This second video signal is conveyed via conductor 16 to black level adjuster and/or signal manipulator 17 (which manipulator may, for example, also operate to apply gamma correction to the signal applied thereto) whence it is applied to a modulating electrode of the second display tube 18.

In operation the negative 4 is first replaced by a photographic film. The object 11 is initially omitted and the apparatus set into operation, exposure being to the plain X-ray field only. The film is therefore exposed to light from the scanning of the spot 2 over the scanner tube face, this light including an image of any spatial noise introduced for example in the image converter tube 12, the tube 1, or because the X-ray field is not completely plain. The film is then developed and a negative thereof introduced into the system in its place. If the exposure and development of the film have been correct the negative will now effectively remove the spatial noise introduced and, in the absence of the object 11, the photo-multiplier 7 will "see" a perfectly plain field. If the object 11 is now introduced an X-ray image thereof which is free from spatial noise generated in the system by the aforementioned causes may be produced on the face of display tube 18, in spite of the presence of the black level adjuster 17, which would normally accentuate the effect of such noise. It will be appreciated that again the film and negative may insted both be situated at the image plane formed at the face of the tube 1, fibre optical elements then being preferably employed at this face as described above with reference to FIGURE 2. As also described with reference to FIGURE 2, the lens system 3 may be omitted if the film and negative are moved in this way, and the components 6 and 7 then closed up to it.

It will be appreciated that, by omitting the elements 10, 11 and 12 an advantageous television camera system with black level adjustment will be obtained from the embodiment shown in FIGURE 3. If in addition the element 14 is omitted and the element 17 replaced by a simple conductor the system will form a radar display device if a radar video signal is fed into conductor 15. The negative 4 may then be used to remove unwanted signals, for example those due to uninteresting fixed objects in the area scanned, provided that the area scanned when a given negative 4 is provided is always the same and is projected on the negative with the same scale from the display on the tube 18.

Figure 4:
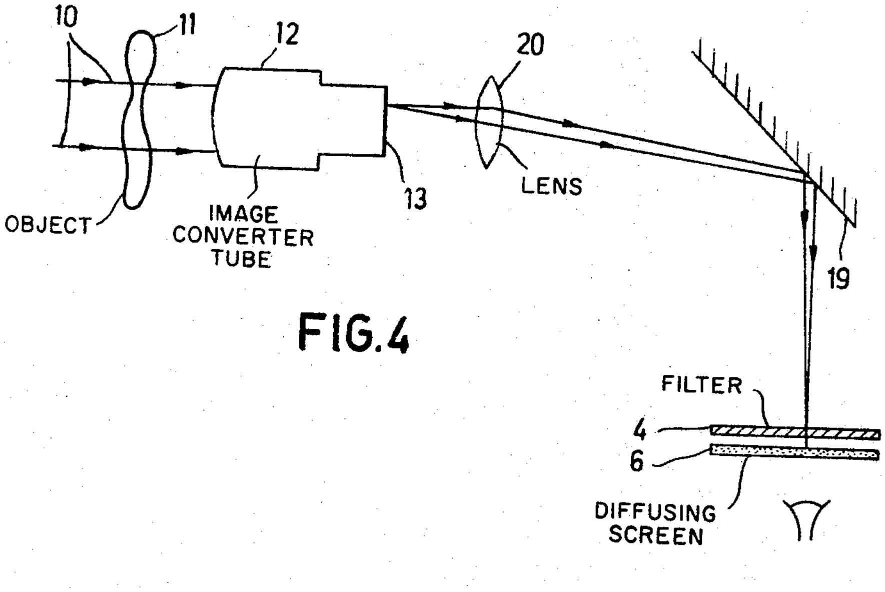
FIGURE 4 is a diagram of a direct viewing X-ray conversion and display system.

FIGURE 4 shows the invention applied to a direct viewing X-ray converter and display system. In this figure X-rays 10 traverse an object 11 and are incident upon the sensitive face of an X-ray image converter tube 12 which produces a first visual image thereof on a phosphor screen 13. An image of this first image is formed by the combination of a lens 20 and a plane mirror 19 on a diffusing screen 6, the light traversing the photographic negative 4 arranged in its path before reaching the screen. (The mirror is included in order to enable an observer to avoid an excessive X-ray dose on looking at the screen.) In the same way as described with reference to FIGURE 3 a film is first placed in the system instead of the negative 4 and is exposed to light from the spatial noise image on the screen 13 in the absence of the object 11. It is then developed and a negative 4 thereof placed in the system. With correct exposure and development it will be seen that again any spatial noise introduced for example in the tube 12 or because the X-ray field 10 is not a plain one will be effectively removed by this negative, and an X-ray image of the object 11 may be obtained at the screen 6 free from such noise. Again both the film and the negative 4 may be placed in the image plane occurring at the screen 13 which preferably then includes fibre optical elements to extend said image plane to the outside of the tube 12. In this case the lens 20 and the screen 6 may be omitted.

It will be appreciated that, although the systems shown in FIGURES 3 and 4 are applied to modify the X-ray transmission image of object 11, the system will work equally well when the object 11 is omitted and the rays 10 comprise those from an image in radiation of a different wavelength e.g. infra-red radiation, which image is focussed upon the converter tube 12 which then must be sensitized instead to such radiation.

It has been mentioned above that the processes of exposure and development of the film are somewhat critical if satisfactory cancellation of spatial noise is to be achieved. The reason for this will now be given with reference to FIGURE 5 of the drawings.

Figure 5:
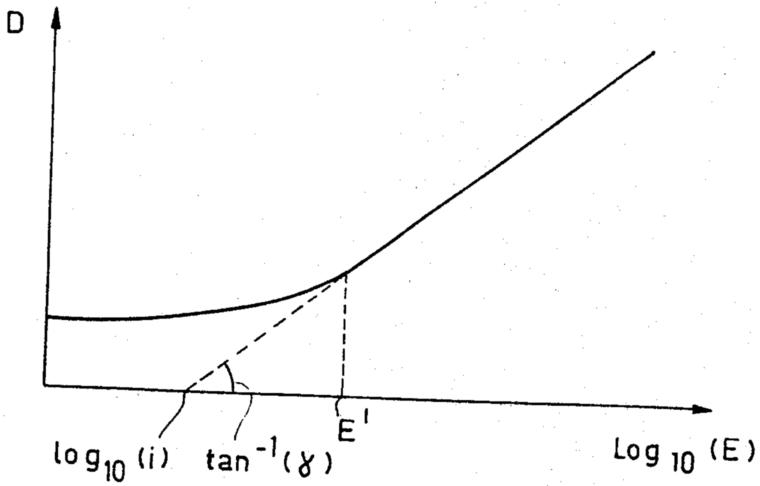
FIGURE 5 is a curve illustrating the relationship between optical density and exposure of photographic film which may be employed in the systems of FIGURES 1 to 4.

It is well known that a plot of film negative density D ("density" being used in the optical sense) against the logarithm to the base ten of the exposure E of the film has the form shown in FIGURE 5. Above a certain value of E denoted by E′ the curve is seen to be linear of slope $\delta$ and may be expressed as $$D=\gamma(\log_{10} E-\log_{10} i) \qquad (1)$$

Suppose now a film is premilinarily exposed a certain amount E′ to a perfectly uniform radiation field. Any subsequent exposure will carry its density D up the linear part of the curve and D will be given by Equation 1.

Suppose this film is now placed in any of the systems shown in FIGURES 1 to 4 and exposed as described with reference to these figures to a plain field of average intensity $I_1$ for time $t_1$. Suppose spatial noise is introduced somewhere in the system so that the actual exposure of a given point of the film will vary as a function of the location of that point, which location may be conveniently described by the Cartesian co-ordinates $x$, $y$ of that point. We have then (by definition of exposure E) that $$E=t_1I_1f(x,y)$$

at any point. Substituting for E in Equation 1 we get $$D=\gamma[\log_{10}\ (t_1I_1f(x,y))-\log_{10} i] \qquad (2)$$

The negative is now used as a spatial noise elimination filter in one of the systems as described. Suppose radiation of mean intensity $I_2$ is incident upon it in this application. This intensity will be a function both of its position in the image it is desired to observe, say F $(x,y)$, and of its position relative to the spatial noise, i.e. $f(x,y)$. Thus at any point of the negative the incident intensity may be written as $$I_2F(x,y)f(x,y) \qquad (3)$$

It is known that the optical density D of a substance is defined by $$D=\log_{10}\left(\frac{\text{Incident intensity of radiation}}{\text{Transmitted intensity of radiation}}\right)$$

$$=\log_{10}\left(\frac{I_{\text{in.}}}{I_{\text{trans}}}\right)$$

say.

Whence $$I_{\text{trans}}=\frac{I_{\text{in.}}}{10^{D}} \qquad (4)$$

so that the radiation transmitted by any part of the negative used in the system may be obtained by substituting in Equation 4 Expression 3 for $I_{\text{in}}$ and for D from Equation 2. If this is done we obtain $$I_{\text{trans}}=\frac{I_2F(x,y).f(x,y)}{10\gamma\,\{\log_{10}[t_1I_1f(x,y)]-\log_{10} i\}} \qquad (5)$$

Now if $\gamma=1$, Expression 5 may be simplified to $$i_{\text{trans}}=\frac{I_2F(x,y).f(x,y).i}{t_1I_1f(x,y)}$$

$$=K.F(x,y) \qquad (6)$$

where K is a constant of value depending on the values of $I_1$, $t_1$ and $I_2$ actually used.

It will be seen that the spatial noise represented by $f(x,y)$ has disappeared in the Expression 6. This will only occur if density D is given by Equation 1 and if $\gamma=1$. Thus, in order that satisfactory elimination of certain spatial noise is achieved by using a photographic negative as described, the film must first be exposed to a perfectly uniform radiation field to an extent such as to bring its subsequent treatment in the system on to the linear part of the curve of FIGURE 5. It must also be such that $\gamma=1$. The fulfillment of this second condition is quite possible but good results depend on the process of film development used so that care must be taken with this development.

What is claimed is:

1. An image conversion system comrising a flying spot scanning device having a screen, whereby a pattern of light is produced on said screen, and an optical system positioned to project said pattern of light, said optical system comprising optical filter means positioned in an image plane of said optical system, said optical filter means having a negative image of spatial noise of said conversion system.

2. An image conversion system comprising a flying spot scanning device having a screen, whereby a pattern of light is produced on said screen, a diffusing plate, an optical system positioned to project said pattern on said plate, and a photo-multiplier device positioned to receive light from said plate, said optical system comprising optical filter means positioned in an image plane of said optical system, said optical filter means having a negative image of the spatial noise in said conversion system.

3. An image conversion system comprising a flying spot scanning device having a screen, whereby a pattern of light is produced on said screen, an optical filter, a bundle of fibre optical elements extending between said screen and said filter, whereby the pattern of light on said screen is transmitted to said filter, a diffusing plate, an optical system positioned to project light from said filter onto said diffusing plate, and photomultiplier means positioned to receive light projected on said plate, said filter having a negative image of spatial noise of said conversion system.

References Cited

UNITED STATES PATENTS 3,149,968 9/1964 Stephens -------- 250—237 X

RALPH G. NILSON, *Primary Examiner.*

M. ABRAMSON, *Assistant Examiner.*